C. WHITEHOUSE.
Making Augers.
No. 91,503.
Patented June 15, 1869.
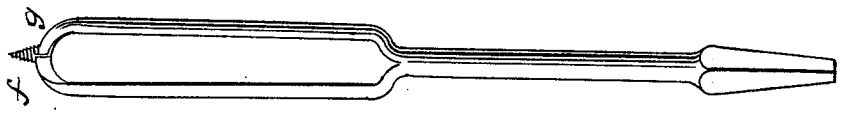
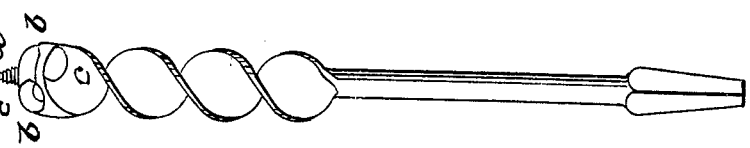
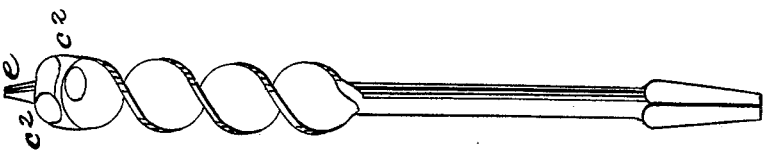
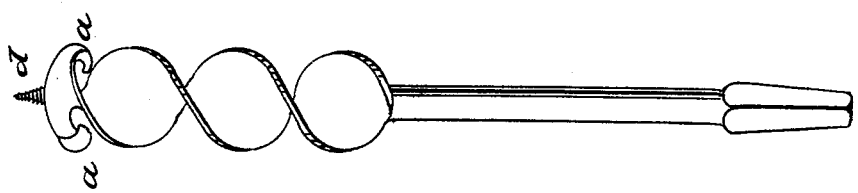
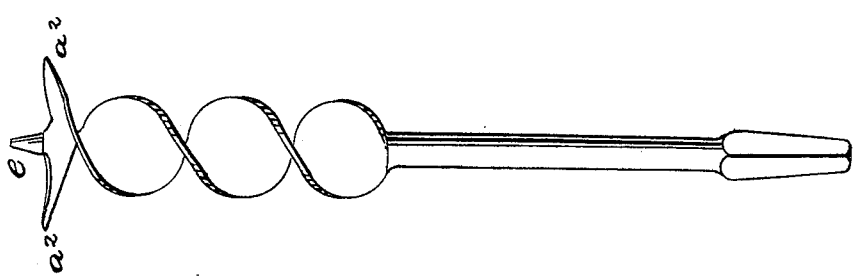
WITNESSES
George Shaw
Richard Kerrett
INVENTOR
Cornelius Whitehouse

United States Patent Office.

CORNELIUS WHITEHOUSE, OF BRIDGTOWN, NEAR CANNOCK, ENGLAND.

Letters Patent No. 91,503, dated June 15, 1869.

IMPROVED PROCESS FOR MAKING AUGERS AND BORING-BITS.

The Schedule referred to in these Letters Patent and making part of the same.

*To all to whom it may concern:*

Be it known that I, CORNELIUS WHITEHOUSE, of Bridgtown, near Cannock, in the county of Stafford, England, edge-tool and auger-maker, a subject of the Queen of Great Britain, have invented or discovered new and useful "Improvements in the Manufacture of Augers, Boring-Bits, and other similar tools;" and I, the said CORNELIUS WHITEHOUSE, do hereby declare the nature of the said invention, and in what manner the same is to be performed, to be particularly described and ascertained in and by the following statement thereof; that is to say—

My invention consists of the improvements hereinafter described, and illustrated in the accompanying drawing, in the manufacture of augers, boring-bits, and other similar tools.

I will describe and illustrate my invention as applied to the manufacture of augers, by which description and illustration I believe the application of my invention to boring-bits and other similar tools will be readily understood.

In manufacturing augers according to my invention, I form, in the ordinary way, of sand or other material, parts of a mould, the said parts of a mould being formed upon a pattern-auger.

I prefer to make the mould in two parts, but I do not limit myself thereto, as, where the form of the auger requires it, the mould may be made in three or more parts.

Having put the parts of the mould together and secured them in position, I pour into the said mould melted steel, homogeneous iron, or other compound of iron and carbon having the nature of steel, or which, by subsequent treatment, can be converted wholly or superficially into steel.

After the solidification of the melted metal, the mould is opened, and the auger cast therein is removed therefrom.

The said auger is afterwards annealed by being heated in contact with hematite iron-ore or other iron-ore of similar composition.

The steel or iron of which the auger is made is thereby wholly or partially decarbonized or softened.

I next shake a number of the cast-augers in an ordinary shaking-tub, by which shaking the particles of sand or iron-ore attached to them are removed, and the augers partially brightened.

While the auger is still in a soft state, I bend, bore, file, or otherwise fashion any parts of it which may require a change of form.

For example, when the auger has curved wings of the kind represented at $a$, Figure 1 of the drawing, I cast the auger in the form represented in Figure 2, in which the wings marked $a^2\ a^2$ are cast without the curvature they have in the finished auger, fig. 1, and I give them the required curvature, and file them into proper shape before proceeding to the next or hardening-process. When, instead of curved wings, the auger has angular wings, I cast the wings straight, as represented in fig. 2, and bend or fashion them into the required shape before filing and hardening.

When the auger has solid wings, that is, wings, the ends of which are not detached from the auger, as represented in the auger, Figure 3, in which figure the said wings are marked $b\ b$, I cast the said wings in the manner represented in Figure 4, that is, without perforations, and while the said auger, fig. 4, is in a soft state, I make or bore therein, at the parts marked $c^2\ c^2$, perforations similar to those marked $c\ c$ in fig. 3.

I also, while the augers are in a soft state, flie into shape the wings, and form the screw or point $d$ upon the ends $e\ e$ of the augers.

Figure 5 represents an auger of the kind described and represented in the specification of Letters Patent granted to me in England, dated June 13, 1868, No. 1,935.

In manufacturing this kind of auger according to my present invention, I cast it as previously described, and, after the annealing or softening-process, I fashion the cutting-edge or edges $f$ and screw or point $g$.

After the required form has been thus given to the several parts of the augers, I then harden the said augers.

When the said augers are made of steel or of a quality of iron capable of being hardened by the ordinary hardening-process, I harden them by the said hardening-process; that is to say, I heat them to redness and plunge them into oil or water.

When the augers are made of iron, which will not harden by this, the ordinary hardening-process, or in which the hardening-property has been destroyed by the process of annealing, I case-harden or convert the auger partially or wholly into steel by heating the said auger in contact with prussiate of potash, or by any of the well-known processes employed for communicating the hardening-property to iron or steel. After the case-hardening or converting-process last described, I harden the augers by the ordinary hardening-process of heating and plunging them into water or oil. After hardening, the augers may be brought to the required temper in the ordinary way. The augers are polished and finished in the same manner as wrought-steel augers are polished and finished.

I make the moulds by which I carry my invention into effect either of sand or other nonmetallic material of which moulds are or may be made, or I make the said moulds of metal.

When I employ metal moulds, I prefer to make the said moulds of cast-steel or cast-iron.

The kind of cast-iron which I prefer is that which can be annealed or decarbonized by being heated in contact with hematite, and which is commonly called malleable cast-iron.

In using metal moulds, they may be heated before casting the metal in them, to prevent the too sudden cooling or chilling of the cast-metal.

When I make the augers of homogeneous iron or malleable cast-iron, I prefer to use sand moulds, but when I make the said augers of cast-steel, I prefer to use metal moulds.

In the latter case the cast-steel augers are more dense and free from the honey-comb structure which frequently arises when steel is cast in sand moulds.

Although I have only described the manufacture of a single auger, yet I wish it to be understood that several augers of the same or different sizes, and several different kinds of boring-tools, may be made in the same mould.

I do not think it necessary to describe my invention as applied to the manufacture of boring-bits and other similar boring-tools, as the application of my invention to the said articles differs in no essential respect from its application to augers.

Having now described the nature of my invention, and the manner in which the same is to be performed, I wish it to be understood that I do not limit myself to the precise details herein described and illustrated, as the same may be varied without departing from the nature of my invention; but

I claim as my invention—

The manufacture of augers, boring-bits, and other similar tools by the process or combination of processes hereinbefore described, and illustrated in the accompanying drawing; that is to say, making the said augers, boring-bits, and other similar tools, by first casting them of steel or iron, and subsequently softening or annealing the same, bending and shaping into the required form such parts as could not be conveniently cast of the required form, and finally hardening and finishing the said tools, substantially as described and illustrated.

CORNELIUS WHITEHOUSE. [L. S.]

Witnesses:
   GEORGE SHAW,
      7 Cannon Street, Birmingham.
   RICHARD SKERRETT,
      7 Cannon Street, Birmingham.